United States Patent
Weyand et al.

[11] Patent Number: 5,887,724
[45] Date of Patent: Mar. 30, 1999

[54] METHODS OF TREATING BI-MODAL FLY ASH TO REMOVE CARBON

[75] Inventors: Thomas E. Weyand, Beaver Falls; Casimir J. Koshinski, Ambridge, both of Pa.

[73] Assignee: Pittsburgh Mineral & Environmental Technology, New Brighton, Pa.

[21] Appl. No.: 647,189

[22] Filed: May 9, 1996

[51] Int. Cl.$^6$ .............................. B03B 9/00; C04B 14/00
[52] U.S. Cl. ................................. 209/2; 209/10; 209/309; 209/466; 106/405; 106/DIG. 1
[58] Field of Search ................. 209/2, 10, 309, 209/310, 466, 471, 479; 106/405, DIG. 1

[56] References Cited

U.S. PATENT DOCUMENTS

| | | | |
|---|---|---|---|
| 3,769,054 | 10/1973 | Pennachetti et al. | 106/288 B |
| 4,115,256 | 9/1978 | de Zeeuw | 209/3 |
| 4,121,945 | 10/1978 | Hurst et al. | 106/288 B |
| 4,357,234 | 11/1982 | Inculet et al. | 209/127 B |
| 4,426,282 | 1/1984 | Aunsholt | 209/167 |
| 4,453,978 | 6/1984 | Okimura et al. | 106/88 |
| 4,514,289 | 4/1985 | Inculet | 209/127.3 |
| 4,517,078 | 5/1985 | Inculet et al. | 209/127.3 |
| 4,556,481 | 12/1985 | Hepher | 209/127 |
| 4,663,507 | 5/1987 | Trerice | 219/10.55 M |
| 5,047,145 | 9/1991 | Hwang | 209/166 |
| 5,110,362 | 5/1992 | Hoarty | 106/708 |
| 5,160,539 | 11/1992 | Cochran | 106/405 |
| 5,227,047 | 7/1993 | Hwang | 209/166 |
| 5,299,692 | 4/1994 | Nelson et al. | 209/2 |
| 5,390,611 | 2/1995 | John | 110/165 A |
| 5,399,194 | 3/1995 | Cochran et al. | 106/405 |

FOREIGN PATENT DOCUMENTS 10521  1/1911  United Kingdom ....................... 209/2

OTHER PUBLICATIONS

Groppo, J.G. et al., "*Fly Ash Beneficiation By Air Classification*", SME Annual Meeting, Preprint 95–196 (Mar. 1995).

Groppo, J.G. et al., "*A Selective Beneficiation Process For High LOI Fly Ash*", SME Annual Meeting, Preprint 96–57 (Mar. 1996).

Kawatra, S.K. et al., "*Removal Of Unburned Carbon From Fly Ash By Froth Flotation*", SME Annual Meeting, Preprint 96–87 (Mar. 1996).

Coke and Gas in "The Production Of Ultra–Clean Coal", vol. 12—Pub. Date Apr. 1950.

*Primary Examiner*—Tuan N. Nguyen
*Attorney, Agent, or Firm*—Arnold B. Silverman; Benjamin T. Queen, II; Eckert Seamans Cherin & Mellott, LLC

[57] ABSTRACT

A method of reducing the carbon content of a dry bi-modal fly ash includes subjecting the bi-modal fly ash to dry vibrating screen separation into a carbon rich component and a carbon depleted fly ash component with the carbon depleted fly ash component being created with a carbon content less than about 4 percent by weight and at least 50 weight percent of the fly ash component of the bi-modal fly ash. The dry vibrating screen separation is preferably a single step process with no prior substantial concentration of the carbon component of the bi-modal fly ash. It is preferred to employ bi-modal fly ash produced as a result of combustion of coal. A method of making a concrete mixture employing the carbon depleted component is also provided.

12 Claims, 2 Drawing Sheets

METHODS OF TREATING BI-MODAL FLY ASH TO REMOVE CARBON

BACKGROUND OF THE INVENTION

1. Field of the Invention

This invention relates to an improved method for upgrading the pozzolanity of fly ash produced from coal-burning power plants and enhancing its value as a replacement for Portland cement in concrete mixes, as well as other uses. More specifically, the invention relates to an economical, high speed method for removing a predetermined amount of carbon particles from coal combustion fly ash in a controlled and predictable manner.

2. Description of the Prior Art

Fly ash, a major by-product of coal combustion, is produced in very large quantities at coal-fired electric utility power plants throughout the world. In the United States alone, the annual volume of fly ash produced by such plants is reported to be in the range of 50 million tons per year. Of this total, it has been reported that only 25–30% of the fly ash is being reused commercially and that 70–75% is being disposed of in landfills. The rapidly diminishing availability of landfill space and escalating cost of land disposal have made it essential to increase the commercial applicability of coal combustion fly ash and/or separate the fly ash into components that have commercial value.

Concrete generally consists of cement, such as Portland cement, water and aggregate. Due to its pozzolanic characteristics, one of the major commercial applications for coal combustion fly ash has been as a substitute for Portland cement in the manufacture of concrete. Some of the advantages attributed to such fly ash as a concrete additive include increased life of the concrete structure, improved flow and pumping characteristics of the concrete, better workability and finishing capability, and decreases in the amount of water and/or lime required in the concrete mix. Most of these improvements are dependent upon increased and controlled air containment in the concrete mix.

It is known that the presence of unburned carbon particles in coal combustion fly ash adversely affects the ability of the fly ash to be used as an additive in concrete. Specifically, the carbon, which is relatively soft and of low strength, does not bond readily with cement and tends to act as a lubricant between particles in a concrete mix. More specifically, the presence of carbon significantly alters the consistency and amount of air entrained in a concrete mix in which fly ash has been used as a substitute for Portland cement. The use of ash having a high carbon content requires greater water addition and the need for incorporating larger quantities of an air entraining agent in the concrete. This is reflected in regulations promulgated by many states which limit the amount of carbon in fly ash used in the manufacture of concrete to less than 5% by weight, and preferably less than 3% by weight, levels significantly below the 6–20% level frequently encountered in most coal combustion fly ash. It is also known that new combustion conditions increasingly being specified in order to minimize $NO_x$ emissions in power plant stack gases result in increased carbon content in the fly ash produced under these new conditions, thereby further restricting the types and amounts of fly ash that can be utilized in concrete.

In order to maximize the commercial application of coal combustion fly ash as a component in concrete manufacture, and to minimize land disposal of same, many methods have been developed to remove carbon particles from the fly ash, thereby minimizing the adverse effects of the carbon on the air entrainment characteristics of the resulting concrete. Such methods have included chemical means to nullify the adverse effect of the carbon component of the fly ash on controlled air entrainment, combustion means to remove carbon particles from the fly ash prior to use, and gravitational, flotational, electrostatic, magnetic, and mechanical means, and combinations thereof, to remove a significant portion of the carbon component of the fly ash before use.

Chemical methods that may be used to nullify the adverse effects of carbon in fly ash without removing the carbon therefrom are disclosed in U.S. Pat. Nos. 4,453,978 and 5,110,362. U.S. Pat. No. 4,453,978 discloses a process for producing a fly ash-containing concrete in which the amount of air contained therein is unaffected by the quantity of carbon present in the fly ash. This approach involves the use of a lipophilic surfactant of a type of sorbitan-higher aliphatic acid ester as an air entrainment agent. Similarly, U.S. Pat. No. 5,110,362 discloses the use of air entrainment agents including water soluble fatty acid salts, abietic acid salts, and ether sulfates added to the active binder in the concrete to nullify the adverse effects of the carbon component on air entrainment in the concrete. Neither of these prior art methods reduce the amount of carbon in the fly ash/carbon mixture prior to incorporation of the mixture into the concrete.

Combustion means for removing the carbon from fly ash by oxidizing all, or a significant portion, of the free carbon present are also known. U.S. Pat. No. 5,390,611 discloses a method and apparatus whereby microwave energy is used to raise the temperature of the carbon component of the fly ash/carbon mixture to the ignition point in an atmosphere containing an excess of air thereby removing the carbon by oxidation. A second known thermal method of reducing the carbon content of fly ash, disclosed in U.S. Pat. Nos. 5,160,539 and 5,399,194, involves introducing the fly ash/carbon mixture into a dry bubbling fluid bed, supplying air thereto, and heating the fluid bed to temperatures in the ranges of 800° F.–1,300° F. and 1,300° F.–1,800° F., respectively. Another known thermal process for removing carbon from fly ash, involving the use of hollow feed screws to tumble the fly ash/carbon mixture in electrically-heated pre-heat and combustion chambers while injecting air and oxygen into the tumbling mass through holes in the hollow feed screws, is disclosed in U.S. Pat. No. 5,390,611. All of these thermal methods, although effective in reducing the amount of carbon present in the fly ash, are energy intensive and involve costly material handling procedures.

Electrostatic means for removing carbon from a fly ash/carbon mixture are disclosed in U.S. Pat. Nos. 4,357,234, 4,514,289, and 4,517,078. In each of these processes, separation is achieved by generating an alternating electric field between electrodes in a manner that causes a centrifugal force to act upon the charged particles of the fly ash/carbon mixture moving between the electrodes such that the lighter, more highly charged carbon particles are separated from the heavier, less charged particles of fly ash. An alternative means of removing carbon from fly ash, disclosed in U.S. Pat. No. 4,556,481, involves moving a fly ash/carbon mixture between a horizontal bottom porous electrode and a horizontal top electrode, maintaining the fly ash/carbon mixture in a fluidized state by means of a gas stream passing upwards through the bottom porous electrode, and maintaining an electric field between the electrodes that is shaped so as to impart a centrifugal force to the charged particles which separates the lighter, more highly charged carbon particles from the fly ash particles.

The use of air classification to separate carbon from a fly ash/carbon mixture into multiple size fractions has been disclosed in Groppo, J. G. et al. "Fly Ash Beneficiation By Air Classification," SME Annual Meeting, March, 1995.

In addition to the aforementioned single-step processes for removing carbon from fly ash, U.S. Pat. No. 4,115,256 discloses a multi-step continuous method for recovering a metal component and a carbonaceous component from a metal/fly ash/carbon mixture. The process involves first passing the metal/fly ash/carbon mixture through a magnetic field to remove the metal component therefrom and, subsequently, passing the metal-free fly ash/carbon mixture through a high tension separator in which the conductive carbon is separated from the dielectric fly ash. A second known multi-step method for separating carbon from a fly ash/carbon mixture containing an iron-bearing component into its constituents, described in U.S. Pat. No. 3,769,054, requires significant concentration of the carbon component prior to its removal from the fly ash/carbon mixture. In the first step of this method, the iron-bearing constituent is separated from the fly ash/carbon mixture by magnetic means. In the second step, the iron-free mixture is subjected to air classification where it is separated into a fine fly ash/low carbon component and a coarse fly ash/high carbon component in which the carbon concentration has been increased to a minimum of 25% by weight. In the third step, the coarse high-carbon component is subjected to screening through a 150 mesh sieve in order to remove the most coarse (+150 mesh) carbon particles. The −150 mesh fraction is then subsequently pelletized, preheated, and sintered to form an improved pozzolanic material.

Multi-step methods for removing carbon from fly ash using flotation means are also disclosed in U.S. Pat. Nos. 4,121,945, 4,426,282, 5,047,145, 5,227,047, and 5,299,692. The method disclosed in U.S. Pat. No. 4,121,945 involves first passing a fly ash/carbon mixture through a 50 mesh sieve to remove only the larger particles of carbon and other agglomerated particles, next adding water to the −50 mesh fly ash/carbon mixture, adding kerosene to the resulting slurry, and then passing the kerosene-containing slurry through a series of flotation cells in which a significant portion of the carbon in the slurry is removed via froth flotation. U.S. Pat. Nos. 4,426,282, 5,047,145, and 5,227,047 describe multi-step methods in which the carbon content of fly ash/carbon mixtures is reduced using wet flotation means which do not involve initial coarse screening.

It has been known to employ wet means, such as froth flotation in processing fly ash. See "A Selective Beneficiation Process for High LOI Fly Ash," Groppo et al., SME Annual Meeting, March, 1996.

Although these prior art separation methods effectively remove carbon from fly ash/carbon mixtures, they are based upon (i) the use of complex, costly equipment, (ii) the need to concentrate the carbon prior to removing it from the mixture, (iii) the use of multi-step processes that involve extensive materials handling, or (iv) the addition of liquid to the mixture prior to separation and the subsequent need to dry the separated components prior to use.

There remains, therefore, a need for a simple, one-step, dry method for reducing the carbon content of fly ash/carbon mixtures without prior concentration of the carbon in the mixture. This reduced carbon/fly ash mixture can then be employed in lieu of Portland cement in concrete. Use of such a method would greatly increase the consumption of coal combustion fly ash as an additive in concrete and significantly reduce the volume of fly ash that must be disposed in landfills.

SUMMARY OF INVENTION

The present invention has met the hereinabove described needs. The invention provides a method for economically reducing the carbon content of a fly ash/carbon mixture to a level that enhances performance of the mixture as an ingredient in concrete. The reduction is preferably achieved by passing a dry fly ash/carbon mixture through a screen of a mesh size selected specifically to remove the desired amount of carbon while minimizing the quantity of fly ash removed therewith. The carbon removal is preferably achieved in a single pass through a screen without requiring prior concentration of the carbon in the mixture.

It is an object of this invention to effect removal of carbon from a fly ash/carbon mixture to a level that enhances the characteristics of the mixture as an ingredient in concrete.

It is another objective of this invention to separate a desired amount of carbon from a fly ash/carbon mixture while minimizing the quantity of fly ash particles separated therewith.

It is a further object of this invention to reduce the carbon content of a fly ash/carbon mixture to less than about 4% by weight, and preferably less than about 3% by weight, using a single processing step.

It is a further object of this invention to reduce the carbon content of a fly ash/carbon mixture using simple, inexpensive dry process.

It is a further object of this invention to remove carbon from a fly ash/carbon mixture without prior concentration of the carbon particles in the mixture.

It is a further object of this invention to achieve removal of carbon from a fly ash/carbon mixture without first incorporating the mixture into a liquid medium.

It is a further object of the present invention to provide a method of making concrete by employing a reduced carbon cement.

These and other objects of the invention will be more fully understood from the following detailed description of the invention on reference to the illustrations appended hereto.

BRIEF DESCRIPTIONS OF THE DRAWINGS

All percentages in these figures are weight percent.

DESCRIPTION OF PREFERRED EMBODIMENTS

Figure 1:
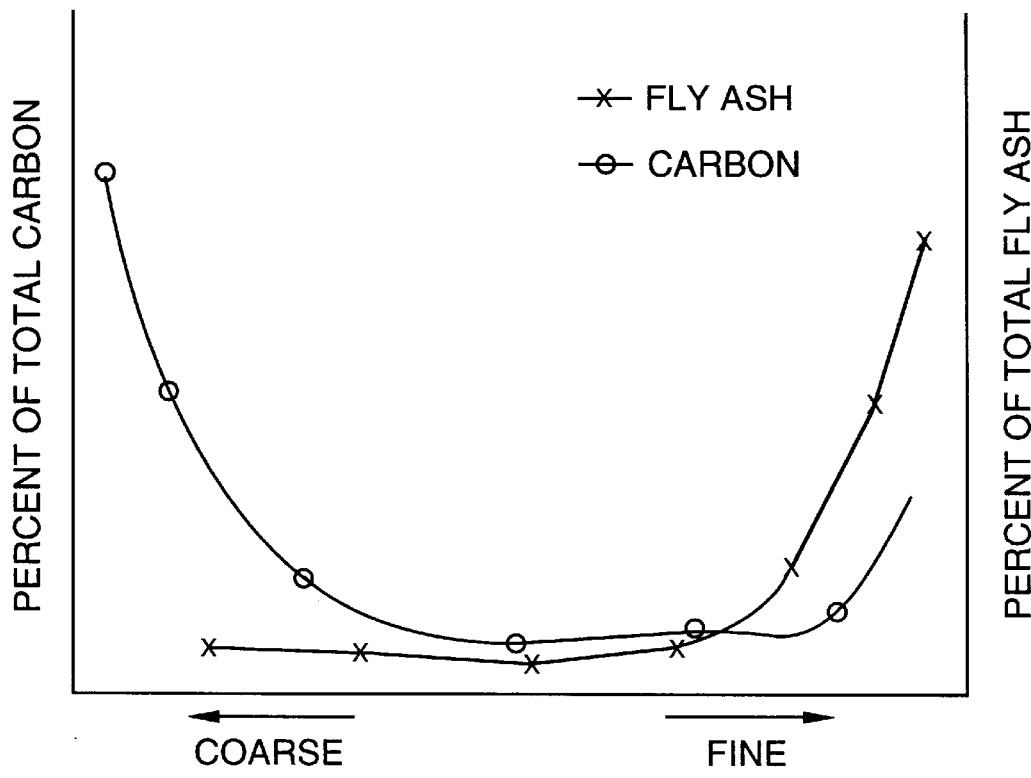
FIG. 1 is a plot of particle size distribution of the fly ash and carbon components of fly ash/carbon mixtures.

Certain fly ash/carbon mixtures are characterized by a bi-modal particle size distribution in which the particle size of the carbon component is biased toward the coarse size fractions of the mixture, while the particle size of the fly ash component is biased toward the fine size fractions of the mixture. In such mixtures, the weight fraction of the carbon component generally decreases in an essentially exponential fashion as the particle size of the carbon component decreases and the weight fraction of the fly ash component in the mixture increases in an essentially exponential fashion as the particle size component of the fly ash decreases. Fly ash/carbon mixtures exhibiting such bi-modal particles size distribution, hereinafter referred to as "bi-modal fly ash", normally are characterized by particle size distribution curves for each component similar to those illustrated in FIG. 1 with the arrows adjacent the words "coarse" and "fine" indicating the direction of increase in each characteristic.

The present invention employs different particle size distributions of the carbon component and the fly ash component in bi-modal fly ash to economically remove an amount of carbon from such bi-modal fly ash sufficient to reduce the total carbon content of the remaining carbon-depleted fly ash to 4% by weight, or less. This is accomplished by passing the bi-modal fly ash through a screen containing openings of a size selected to resist passage of a significant portion of said carbon component while allowing a major portion of the fly ash component to readily pass through the openings in the screen. It has further been determined that the separation can be achieved at high speeds using a single screen of much finer mesh size than was previously thought to be commercially viable for dry screening of materials consisting of a large proportion of very fine particles.

The invention provides a simple, one-step, dry method for reducing the original weight fraction of the carbon component in the major portion of a bi-modal fly ash from greater than 4% less than 4%. This is accomplished while minimizing the quantity of the fly ash component of the bi-modal fly ash removed therewith by passing the bi-modal fly ash through a vibrating device containing a screen of a fine mesh size specifically selected to reduce the total weight of carbon in the carbon-depleted fly ash component that passes through the screen to 4% by weight, or less, while maximizing the weight of said carbon-depleted fly ash component that passes unhindered through the screen.

Figure 2:
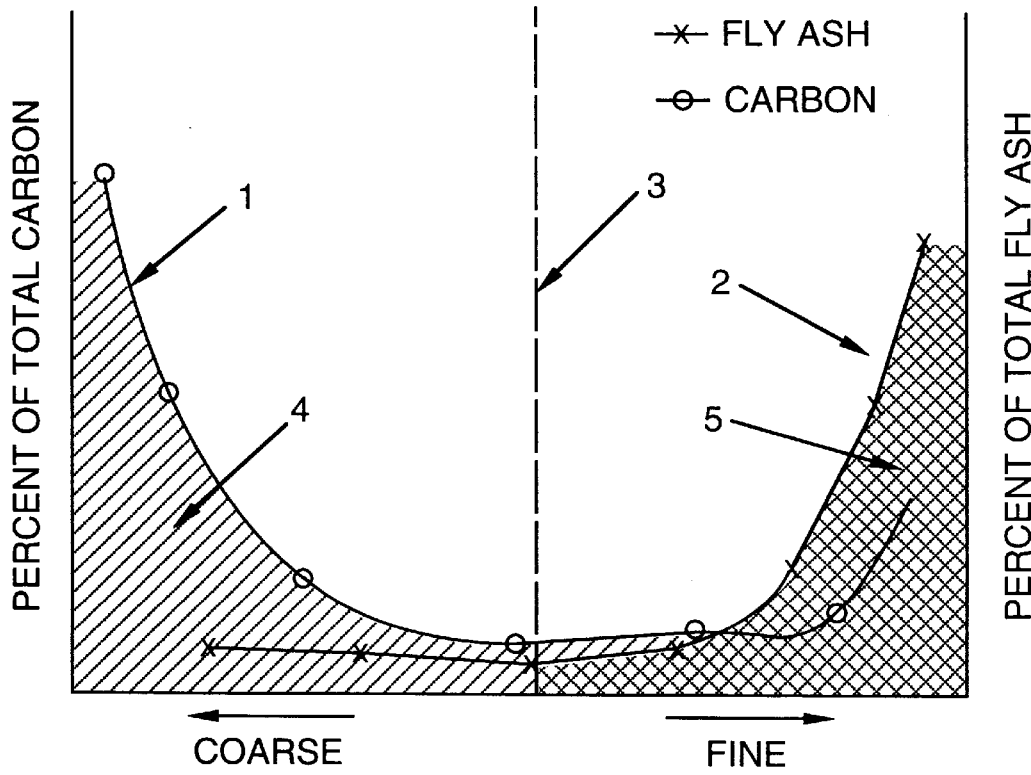
FIG. 2 is a plot of the effect of screening fly ash compositions on the proportions of the fly ash components separated thereby.

FIG. 2 illustrates the effect of screen mesh size on the ability of the screen to retain a significant quantity of the carbon component of bi-modal fly ash while permitting the major portion (greater than 50 percent by weight) of the fly ash component to pass therethrough. As shown by the carbon component weight distribution curve 1, which shows the percentage of the total carbon component contained in each mesh fraction, and the fly ash component weight distribution curve 2, which shows the relative percentage of the total fly ash component contained in each mesh fraction, the cumulative weight percent of the carbon component removed from the bi-modal fly ash by retention on a screen of particular mesh size 3, illustrated by the shaded area under the carbon component curve 4, and the cumulative weight percent of the carbon-depleted fly ash component passing through that screen 5, illustrated by the shaded area under the fly ash component curve, are both high, thereby effecting a commercially significant, low cost separation of the two components in a single-step dry operation that enhances the value of the carbon-depleted fly ash component as an additive in concrete.

A preferred method of practicing the invention to effect the aforementioned removal of carbon from bi-modal fly ash to achieve a total carbon content of 4%, or less, by weight while allowing a minimum of 70% by weight of the carbon-depleted fly ash component thereof to pass through said screen, involves introducing dry bi-modal fly ash that has not been subjected to prior concentration of the carbon component therein to a vibrating device containing a 200 mesh screen and continuously removing therefrom the carbon-rich +200 mesh fraction retained on said screen and the carbon-depleted −200 mesh fraction that passes through said screen prior to application of the −200 mesh carbon-depleted fly ash as an additive to concrete.

In another preferred embodiment of the invention, there is sufficient removal of carbon from bi-modal fly ash to effect a total carbon content of 3%, or less, by weight while passing a minimum of 60% by weight of the fly ash component thereof through the screen. This is accomplished by introducing dry bi-modal fly ash that has not previously been subjected to prior concentration of the carbon component therein to a vibrating device containing a 270 mesh screen and continuously removing therefrom the carbon-rich +270 mesh fraction retained on said screen and the carbon-depleted −270 mesh fraction that passes through said screen prior to application of the −270 mesh carbon-depleted fly ash component as an additive to concrete.

The vibratory motion of the screen used to separate the carbon-rich fraction from the carbon-depleted fraction of the bi-modal fly ash may be achieved by mechanical, ultrasonic, electromagnetic means or any other means that achieves the degree of vibration required for efficient separation of the carbon-rich and carbon-depleted fractions of bi-modal fly ash. The use of a directed air flow through the screen during the separation process may be employed to increase separation efficiency.

The following examples provide examples of preferred practices in employing the methods of this invention.

EXAMPLE 1

This example illustrates that satisfactory carbon removal from bi-modal fly ash can be achieved by subjecting dry bi-modal fly ash, which has not been previously treated for the purpose of concentrating the carbon particles therein, to vibratory screening using either a 200 mesh screen or a 270 mesh screen.

Figure 3:
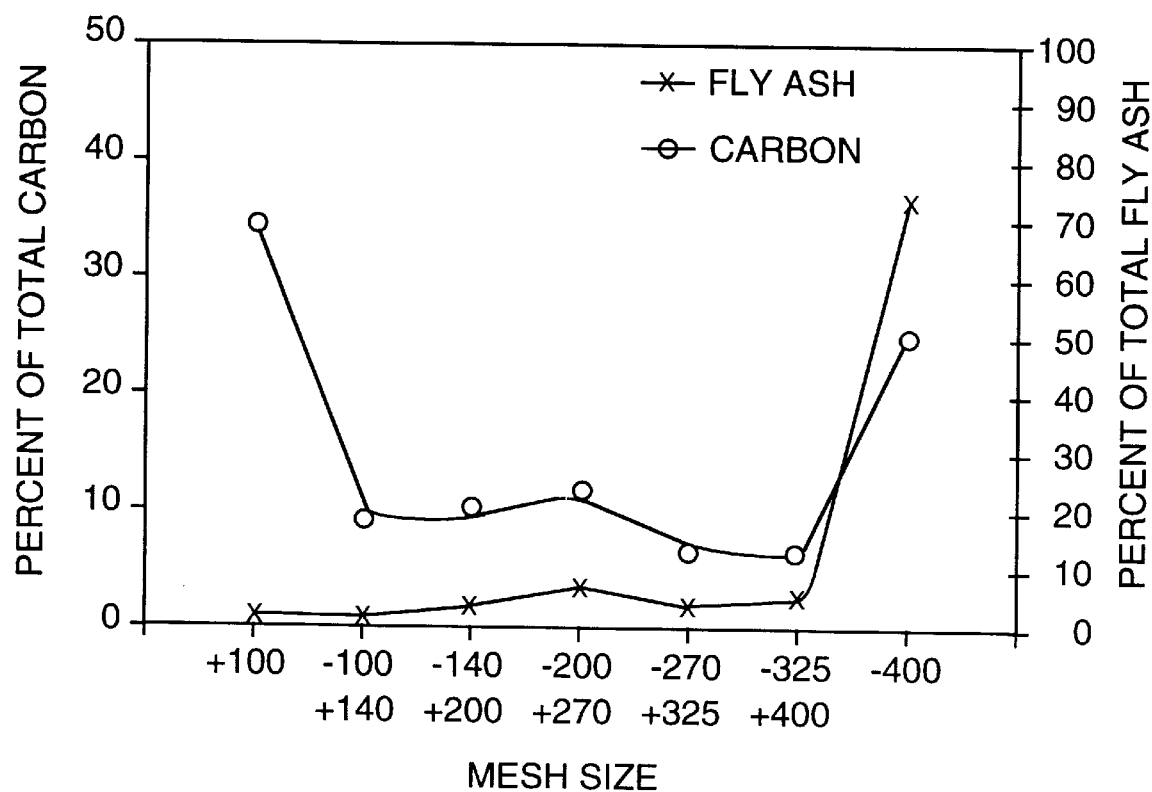
FIG. 3 is a plot of the particle size distribution of the fly ash compositions of Example 1 hereof.

The bi-modal fly ash utilized in this example was a representative sample of bi-modal fly ash resulting from coal combustion at a commercial electric power generating plant. The total carbon weight content of this as-produced bi-modal fly ash prior to screening, as determined by standard loss-on-ignition (LOI) analysis, was 6%. The total cumulative weight distributions of the carbon component and of the fly ash component of the bi-modal fly ash sample prior to treatment are shown in FIG. 3.

A 1,028-gram sample of the dry bi-modal fly ash which had not been subject to prior processing and, specifically, not subject to pre-concentration of the carbon portion thereof, was subjected to screening using a stack of six 10-inch diameter screens in a Ro-Tap vibratory screening apparatus and subjected to vibratory screening for a period of 10 minutes. The screen sizes employed in the stack were 100 mesh, 140 mesh, 200 mesh, 270 mesh, 325 mesh, and 400 mesh.

Upon completion of the screening operation, the total weight and total carbon content of each mesh fraction were determined, and the total weights and total carbon contents of the carbon-rich +200 mesh fraction and the carbon-depleted −200 mesh fraction and the carbon-rich +270 mesh fraction and the carbon-depleted −270 mesh fraction of the bi-modal fly ash were calculated therefrom. All carbon contents were determined by standard LOI analysis. The results of this analysis are summarized in Table 1.

TABLE 1

| Mesh Size | Total Weight | Carbon Weight | Percent of Total Carbon Weight | Fly Ash Weight | Percent of Total Fly Ash Weight |
|---|---|---|---|---|---|
| +100 | 39.0 | 21.0 | 34.1 | 18.0 | 1.9 |
| −100 +140 | 22.2 | 5.4 | 8.8 | 16.8 | 1.7 |
| −140 +200 | 45.1 | 5.8 | 9.3 | 39.3 | 4.1 |
| −200 +270 | 80.3 | 7.2 | 11.6 | 73.1 | 7.6 |
| −270 +325 | 44.9 | 3.3 | 5.4 | 41.6 | 4.3 |
| −325 +400 | 58.7 | 3.2 | 5.2 | 55.5 | 5.7 |
| −400 | 738.3 | 15.8 | 25.6 | 722.5 | 74.7 |

The results of the aforesaid analyses, as they pertain to separating the carbon component and the fly ash component using a 200 mesh screen, showed that (a) 52.2% by weight of the carbon portion of the bi-modal fly ash was removed in the +200 mesh carbon-rich fraction, and (b) the total weight of the carbon-depleted fly ash component passing through the 200 mesh screen represented 92.3% of the fly ash portion of the total bi-modal fly ash processed, and (c) the total carbon content of the −200 mesh carbon depleted fraction was 3.2%.

The results of the aforesaid analyses, as they pertain to separating the carbon component and the fly ash component using a 270 mesh screen, showed that (a) 63.9% by weight of the carbon portion of the bi-modal fly ash was removed in the +270 mesh carbon-rich fraction, and (b) the total weight of the carbon depleted fly ash component passing through the 270 mesh screen represented 84.7% of the fly ash portion of the total bi-modal fly ash processed, and (c) the total carbon content of the −270 mesh carbon depleted fraction was 2.6%, making it well suited for use as an additive to concrete.

While many formulations for concrete are known, common to most of them will be a cement or binder, water, and an aggregate.

An example of a suitable formula is:

| Ingredient | Amount (wt. percent) |
|---|---|
| Sand | 24.2 |
| Coarse Aggregate | 59.2 |
| Water | 5.5 |
| Cement | 9.4 |
| Fly Ash | 1.7 |

While, for convenience, the disclosure herein has made reference to continuous removal of the carbon-rich and carbon-depleted fractions of bi-modal fly ash from the separation apparatus, such removal may be either continuous or intermittent, as desired, and may be achieved by removal means readily known to those skilled in the art.

While, for convenience, the disclosure herein has made reference solely to the application of the carbon-depleted fraction of the bi-modal fly as an additive in concrete, it will be apparent to those skilled in the art that one may practice the invention for the purpose of utilizing the carbon-depleted fraction and/or the carbon-rich fraction of bi-modal fly ash in any application in which either of the resulting fractions offer significant economic or technical advantages relative to bi-modal fly ash that has not been processed in accordance with the invention.

It will be appreciated that the method of this invention provides a rapid, cost effective, efficient means of reducing the carbon content of fly ash to a level suitable for use of the fly ash as an additive to concrete, thereby increasing the value of the fly ash and the volume suitable for use in concrete. The increased commercial use of carbon-depleted fly ash created by this invention will significantly reduce the volume of fly ash that must be disposed in landfills. The utilization of the invention to achieve this end is, therefore, of great environmental benefit to society.

Whereas particular embodiments of the invention have been described herein for purposes of illustration, it will be evident to those skilled in the art that numerous variations of the details may be made without departing from the invention as defined in the appended claims.

We claim:

1. A method of reducing the carbon content of dry bi-modal fly ash comprising subjecting said bi-modal fly ash to dry vibrating screen separation to separate said bi-modal fly ash into a carbon rich component and a carbon depleted fly ash component, creating said carbon depleted fly ash component with a carbon content of less than about 4 percent by weight and at least 50 weight percent of the fly ash component of said bi-modal fly ash, and effecting said dry vibrating screen separation without any preliminary separation steps prior to said dry vibrating screen separation.

2. The method of claim 1 including effecting said dry vibrating screen separation in a single step.

3. The method of claim 1 including employing as said dry bi-modal fly ash, fly ash produced by the combustion of coal.

4. A method of reducing the carbon content of dry bi-modal fly ash comprising subjecting said bi-modal fly ash to dry vibrating screen separation to separate said bi-modal fly ash into a carbon rich component and a carbon depleted fly ash component, creating said carbon depleted fly ash component with a carbon content of less than about 4 percent by weight and at least 50 weight percent of the fly ash component of said bi-modal fly ash, effecting said dry vibrating screen separation without substantial prior concentration of the carbon component of said bi-modal fly ash, and effecting said dry vibrating screen separation with a screen having a mesh size of 200 or smaller.

5. A method of reducing the carbon content of dry bi-modal fly ash comprising subjecting said bi-modal fly ash to dry vibrating screen separation to separate said bi-modal fly ash into a carbon rich component and a carbon depleted fly ash component, creating said carbon depleted fly ash component with a carbon content of less than 4 percent by weight and at least 50 weight percent of the fly component of said bi-modal fly ash, effecting said dry vibrating screen separation without substantial prior concentration of the carbon component of said bi-modal fly ash, and effecting said dry vibrating screen separation with a screen having a mesh size selected from the group consisting of 200 and 270.

6. The method of claim 5 including creating said carbon depleted component with said carbon depleted fly ash component with a carbon content of less than about 3 percent by weight.

7. A method of creating a concrete mix comprising subjecting said bi-modal fly ash to dry vibrating screen separation to separate said bi-modal fly ash into a carbon rich component and a carbon depleted fly ash component, creating said carbon depleted fly ash component with a carbon content of less than 4 percent by weight and at least 50 weight percent of the fly component of said bi-modal fly ash, admixing said carbon depleted fly ash component with aggregate material to create said concrete mix, and effecting said dry vibrating screen separation without any preliminary separation steps prior to said dry vibrating screen separation.

8. The method of claim 7 including effecting said dry vibrating screen separation in a single step.

9. The method of claim 7 including employing as said dry bi-modal fly ash produced by the combustion of coal.

10. The method of claim 7 including adding water to said concrete mixture and admixing the water therewith to create concrete.

11. A method of creating a concrete mix comprising subjecting a bi-modal fly ash to dry vibrating screen separation to separate said bi-modal fly ash into a carbon rich component and a carbon depleted fly ash component, creating said carbon depleted fly ash component with a carbon content of less than about 4 percent by weight and at least 50 weight percent of the fly ash component of said bi-modal fly ash, admixing said carbon depleted fly ash component with aggregate material to create said concrete mix, effecting said dry vibrating screen separation without substantial prior concentration of the carbon component of said bi-modal fly ash, and effecting said dry vibrating screen separation with a screen having a mesh size of 200 or smaller.

12. A method of creating a concrete mix comprising subjecting a bi-modal fly ash to dry vibrating screen separation to separate said bi-modal fly ash into a carbon rich component and a carbon depleted fly ash component, creating said carbon depleted fly ash component with a carbon content of less than about 4 percent by weight and at least 50 weight percent of the fly ash component of said bi-modal fly ash, admixing said carbon depleted fly ash component with aggregate material to create said concrete mix, effecting said dry vibrating screen separation without substantial prior concentration of the carbon component of said bi-modal fly ash, and effecting said dry vibrating screen separation with a screen having a mesh size selected from the group consisting of 200 and 270.

* * * * *

UNITED STATES PATENT AND TRADEMARK OFFICE
CERTIFICATE OF CORRECTION

PATENT NO.      :   5,887,724

DATED           :   March 30, 1999

INVENTOR(S) :   Thomas E. Weyand et al.

It is certified that errors appear in the above-identified patent and that said Letters Patent should be corrected as shown below:

Col. 8, line 55, add the word --about-- after the word "than".

Col. 8, line 56, add the word --ash---after the word "fly".

Col. 9, line 2, the word "said" should be --a--
Col. 9, line 7. add the word --about--- after the word "than".

Col. 9, line 8, add the word --ash---after the word "fly".

Signed and Sealed this

Fourteenth Day of March, 2000

Attest:

Q. TODD DICKINSON

Attesting Officer        Commissioner of Patents and Trademarks